Sept. 15, 1959   D. C. MILEY   2,904,011
FLUID OPERATED TIME CYCLE CONTROLLER
Filed March 16, 1956   2 Sheets-Sheet 1
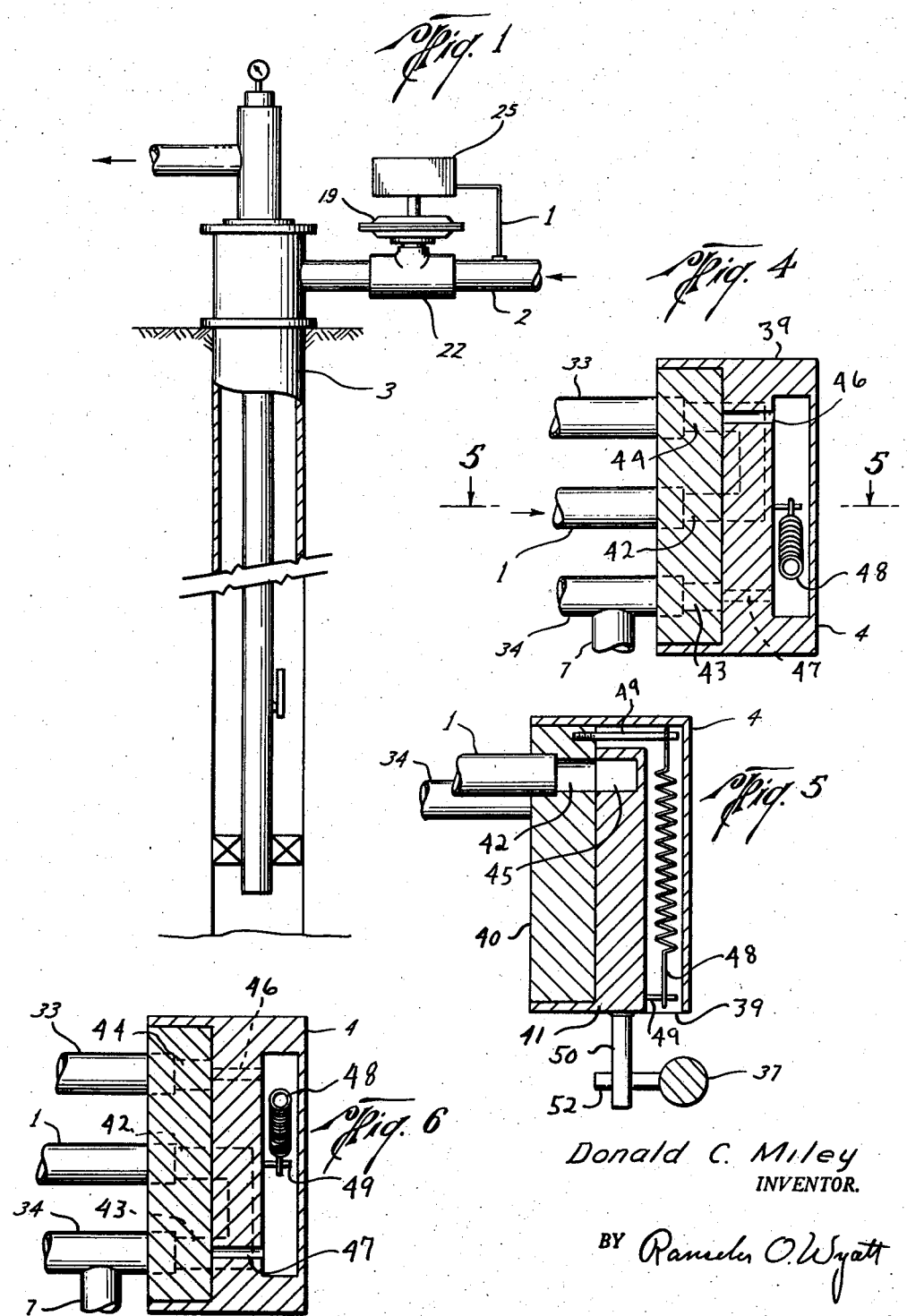
Donald C. Miley
INVENTOR.
BY Ramseln O. Wyatt
ATTORNEY

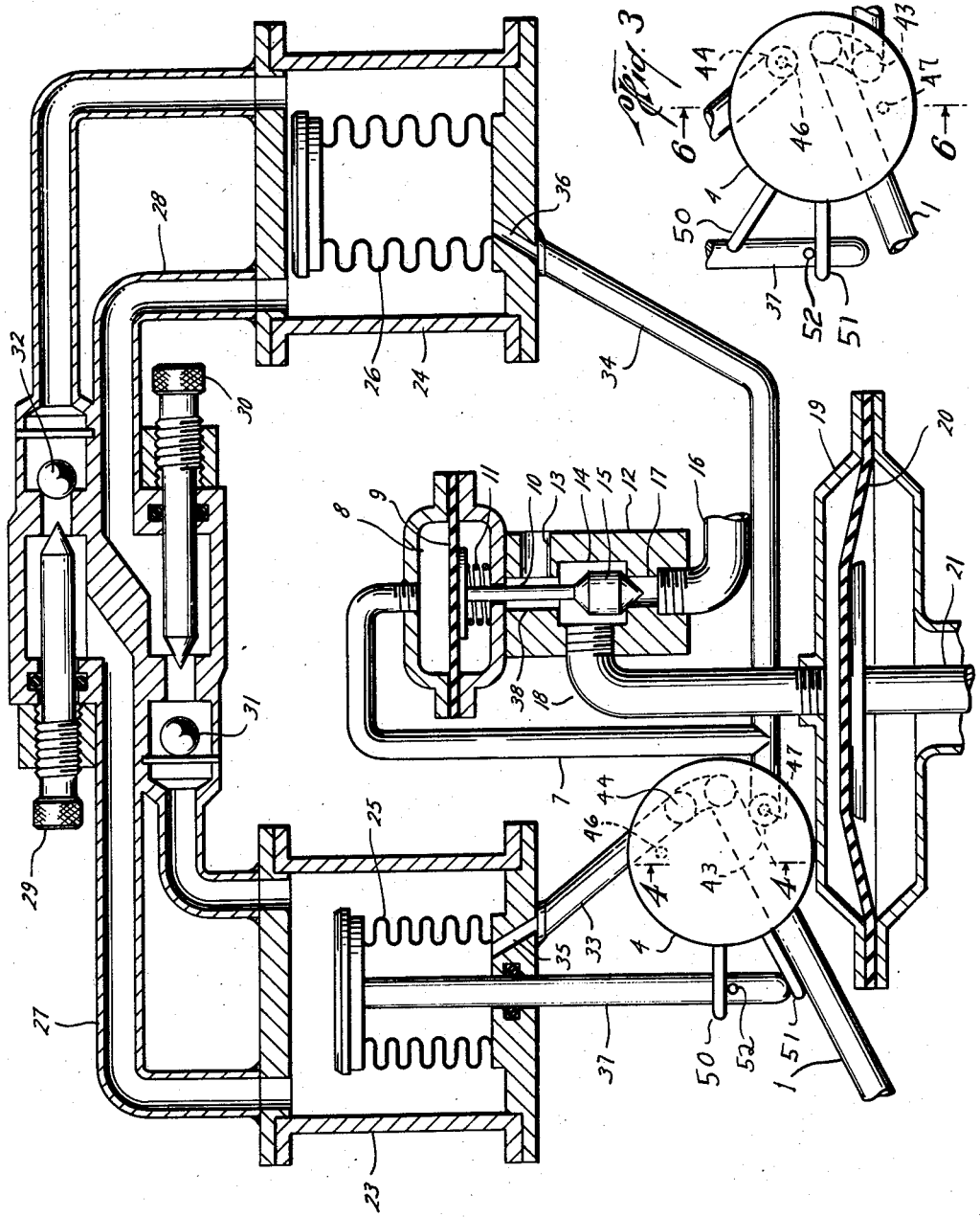

2,904,011

FLUID OPERATED TIME CYCLE CONTROLLER

Donald C. Miley, Houston, Tex.

Application March 16, 1956, Serial No. 572,093

6 Claims. (Cl. 121—48)

This invention relates to a new and useful improvement in a fluid operated time cycle control.

It is an object of this invention to provide a device for controlling the movement of mechanisms, such as the motor valves used in oil field production when injecting intermittent supplies of gas into a well, as in gas lift systems, providing a motor valve control that operates by hydraulic pressure, and that may be regulated as desired, and that receives its operating power from the gas being injected, and having a novel means for alternating the pressure flow.

It is still another object of the invention to provide a fluid operated time cycle control having novel means for adjusting the time interval in the operation of the control.

With the above and other objects in view, the invention has relation to certain novel features of construction, operation and arrangement of parts more particularly defined in the following specifications and illustrated in the accompanying drawings, wherein:

Figure 1 is an elevational view, showing the device as attached to a producing well.

Figure 2 is an enlarged side elevational view, in cross section.

Figure 3 is an enlarged fragmentary view, illustrating the snap valve employed.

Figure 4 is a cross sectional side elevational view of the snap valve taken on the line 4—4 of Figure 1.

Figure 5 is a cross sectional side elevational view of the snap valve, taken on the line 5—5 of Figure 4, and Figure 6 is a cross sectional side elevational view of the snap valve taken on the line 6—6 of Figure 3.

Referring now more particularly to the drawings, the numeral 1 designates a pressure inlet line, such as the supply line 2 for the injection of gas under pressure into a well casing 3.

The pressure inlet leads into a suitable snap action valve, as 4, which has a pair of discharge orifices 43, 44. A flow line 7 leads from the snap valve 4 to the diaphragm chamber 8 in which the diaphragm 9 is mounted. The diaphragm 9 is of any desired material, preferably of rubber, and a valve stem 10 is secured thereto. A housing 12 is mounted beneath the diaphragm chamber 8 into which the stem 10 extends through the passageway 38, in which a seat is formed to receive one end of the valve 15 and a suitable means, as the spring 11, maintains the valve 15 yieldingly seated on the passageway 38. An outlet passageway 13 is formed in the housing 12 and a valve chamber 14 is formed in the housing 12 beneath the outlet passageway 13. A valve 15, attached to the valve stem 10, extends into the chamber 14 and a pressure inlet line 16 is mounted in the bottom of the housing 12 and a passageway 17 leads into the chamber 14 and the valve 15 seats in the said passageway 17.

A pressure line 18 extends from the chamber 14 laterally through the housing 12 and into the diaphragm chamber 19 in which a suitable diaphragm 20 is mounted. A motor valve stem 21 has one end secured to said diaphragm and the other end extending downwardly through the chamber 19 to the motor valve 22.

A pair of fluid containing chambers 23, 24 are mounted in the housing 25 which houses all of the operating mechanism herein described, and in said chambers are suitable expandable bellows 25, 26. The operating fluid is stored in the chambers 23, 24, and flow lines 27, 28 connecting the two chambers, with suitable adjustable flow control valves 29, 30 mounted in the lines 27, 28, said valves being provided with threads for adjustment and tapered at their other ends to seat in the passageways when closed. A back pressure valve, such as 31, 32, may be provided to restrict the flow through each flow line to one direction.

Passageways 35, 36 are formed in the bottom of the chambers 23, 24, leading into the bellows 25, 26. Flow lines 33, 34 lead from the snap action valve 4 to the respective chambers 23, 24 and are in flow connection with the passageways 35, 36. A control arm 37 extends through the floor of the chamber 23 and is inoperative connection with the snap valve 4.

When it is desired to open and close a motor valve intermittently at a predetermined time cycle, the flow of fluid from the chambers 23, 24 through the lines 27, 28, is adjusted by the valves 29, 30. The pressure from the inlet line 1 will flow through the snap action valve 4 into the line 33 expanding the bellows 25 and displacing the fluid in the chamber 23 forcing same through the flow line 28 into the chamber 24, and the gas in the bellows 26 will be vented through the line 34. When the fluid in the chamber 23 has expanded the bellows 25 to its full length, the arm 37 will have operated the snap action valve 4, shifting the outlet to the second position, disconnecting the inlet into the line 33, and permitting the line 33 to vent the bellows 25 and directing a flow of gas pressure into the line 34, to expand the bellows 26. As the gas pressure flows into the line 34, it also flows into the line 7 and diaphragm chamber 8, forcing the diaphragm down and moving the valve 15 into seated position in the passageway 17, closing the flow of pressure through the line 16 and permitting the pressure in the line 18 and chamber 19 to vent through the discharge port 13 and permitting the valve stem 21 to rsie, opening the motor valve 22. When the bellows 25 has been forced to completely collapsed position by the movement of the fluid through the flow line 28, the arm 37 will again actuate the snap action valve 4, shifting the connection to the line 33, permitting the lines 34 and 7 to vent, and moving the valve 15 into raised position, the said valve 15 seating in the passageway 38, and opening the passageway 17 to the inlet of pressure into the chamber 14 and line 18 and chamber 19 moving the diaphragm 20 and valve stem 21 downwardly closing the motor valve 22.

The valves 29, 30 are adjusted to control the flow of fluid between the chambers 23, 24 and to thus determine the time cycle, which will be regulated with the pressure of the fluid in the inlet line 1. A suitable control valve may be provided in the line 1 if it is so desired, although such a valve has not been shown in the drawings, as it is contemplated that if such be desired, it will be of conventional construction to restrict the flow of pressure through the line 1.

The snap action valve 4 employed to change the application of pressure from the line 1 to the lines 33, 34 may be of any desired construction. A preferred form is shown having a housing 39 in which the discs 40, 41 are mounted. The disc 40 will be stationary and has means for receiving the inlet line 1 and the outlet lines 33, 34 and has suitable ports 42, 43, 44 which lead into the movable disc 41. A slot 45, in the disc 41, selectively connects the line 1 with either the line 33 or the line 34, and vent holes, as 46, 47 extend through the disc 41. When the line 34 is in flow connection with the line 1, the line 33 is vented through the port 46 and when the line 33 is in flow connection with the line 1, the line 34 is vented through the port 47. Suitable means is provided to move the disc 41 into the two positions above described, such as the spring 48, which is anchored at one end to the stationary disc 40 as by means of the pin 49, and at the other end to the pin 50 in the disc 41. The pin 49 is mounted between the outwardly extended contact arms 50, 51. A projecting pin 52 is mounted in the arm 37 and is positioned to fit between said arms 50, 51. As the arm 37 moves downwardly, the pin 52 pushes the arm 51 until the pin 49 passes center, and the spring 48 pulls the disc 41 into its alternate position, the arm 50 abutting against the pin 52, which will act as a stop, limiting the movement of the disc 41. When the arm 37 moves with the filling of the bellows 25, the pin 52 will push the arm 50, until the spring passes center and the spring 48 pulls the discs 41 into the alternate position, the arm 51 abutting the pin 52 for limitation of movement, changing the flow of pressure into the alternate line.

While the foregoing is considered a preferred form of the invention, it is by way of illustration only, the broad principle of the invention being defined by the appended claims.

What I claim is:

1. In a time cycle control, a source of fluid pressure, a pair of chambers having hydraulic fluid therein and expandable bellows in said chamber, conduits connecting said chambers, each of said bellows having means for intermittently receiving a flow of said fluid and to fully expand, and to vent said fluid when fully expanded, and a snap action control valve having a rotatable disc and a stationary disc and ports in said stationary disc and connecting channels in said movable disc movable into connection with a pair of said ports in said stationary disc, outwardly extending arms on said rotatable disc operated by said bellows for applying fluid pressure to said control valve to move said valve into one position when one of said bellows is expanded to relieve said pressure and move said valve into another position when said bellows is deflated to admit a flow of fluid pressure into said deflated bellows.

2. In a fluid operated time cycle controller, a motor valve stem, a diaphragm chamber having a diaphragm therein in operative connection with said motor valve stem, a source of fluid pressure, a snap action valve having a rotatable disc with a series of ports therein for directing the flow of said fluid pressure, a pair of outwardly extending arms on said disc, a pair of bellows chambers and a bellows mounted in each of said chambers and flow lines connecting said chambers, hydraulic fluid in said chambers and flow regulating valves in said flow lines, pressure lines from said source of fluid pressure leading into said diaphragm chamber and said bellows, the flow of fluid pressure therein being controlled by said snap action valve, means on one of said bellows for contacting said one of said arms and actuating said snap action valve when said bellows is inflated to direct the flow of fluid pressure into the other of said bellows and into said diaphragm chamber depressing said motor valve stem until the said other bellows is completely expanded and the flow of hydraulic fluid is forced out of the bellows chamber of the expanded bellows into the other bellows chamber and the bellows in said other bellows chamber is completely collapsed and to thereby move said snap action valve by contacting the other of said arms back into the first mentioned position to vent said diaphragm chamber and permit the motor valve stem to move upwardly and to direct the flow of pressure fluid back into said collapsed bellows to repeat the cycle.

3. In a fluid operated time cycle controller, a diaphragm chamber and a diaphragm mounted therein, a motor valve stem in operative connection with said diaphragm, a pair of bellows chambers having expandable bellows therein and having flow lines connecting said chambers and hydraulic fluid in said chambers selectively movable through said flow lines, a snap action valve comprising a fixed and a movable disc and ports in said fixed disc and connected channels in said movable disc movable into and out of flow connection with a pair of said ports in said fixed disc, a pair of outwardly extending arms on said movable disc operated by one of said bellows, a supply line for fluid pressure leading from a source of supply into one of said bellows and said diaphragm chamber and into the other of said bellows only selectively through said snap action valve moving said diaphragm downwardly when one of said bellows is expanded and upwardly when said bellows is deflated.

4. In a motor valve controller, a diaphragm chamber having a diaphragm therein, a valve stem to be controlled, a fluid pressure supply leading into said diaphragm chamber, a valve in said supply line controlling said fluid pressure supply having a fixed disc and a movable disc, ports in said discs movable into and out of alignment, expandable means operated by said fluid pressure supply for intermittently moving said movable disc of said last mentioned valve selectively aligning a pair of ports in said disc to direct a flow of fluid pressure into said diaphragm chamber to move the valve stem into one position and to block said supply of pressure and vent said chamber to move the valve stem into another position.

5. In a motor valve controller, a supply of fluid pressure, a pair of bellows chambers having expandable bellows therein, hydraulic fluid in said chambers and conduits through which said fluid may flow connecting said chambers, means for alternately directing a supply of fluid pressure into one of said bellows to expand the same and move said hydraulic fluid through said conduits and collapse the other of said bellows and to vent the collapsed bellows, said means comprising a snap action valve having a fixed disc and a movable disc, ports in said fixed disc and a connecting channel in said movable disc, arms extending outwardly from said movable disc and a stem on one of said bellows having a lateral stud positioned to contact one of said arms when said bellows is expanded to rotate said movable disc in one direction and to contact the other of said arms and rotate said disc in the other direction when said bellows is collapsed, a motor valve control having an expandable diaphragm, means for alternately directing a supply of fluid pressure to said diaphragm and for blocking said supply of fluid and venting said diaphragm, said means being operated by one of said expandable bellows.

6. In a motor valve controller, a supply of fluid pressure, a pair of bellows chambers having expandable bellows therein, an hydraulic fluid in said chamber and conduits connecting said chambers through which said fluid may flow, means for alternately directing a supply of fluid pressure into one of said bellows to expand same and move said hydraulic fluid to the other chamber to collapse and to vent the other bellows, a motor valve control having an expandable diaphragm, said means for directing a supply of fluid to said bellows also alternately directing a supply of fluid pressure to said diaphragm and venting said diaphragm, said means comprising a fixed and a movable disc, ports in said fixed disc and connecting channels in said movable disc movable into connection with a pair of said ports, a snap action spring on said movable disc to maintain same in extended position, outwardly extending arms on said movable disc being operated by one of said expandable bellows immediately prior to complete collapse and expansion to rotate said rotatable disc and means for selectively determining the time lag between the alternate expansion of said bellows.

(References on following page)

References Cited in the file of this patent

UNITED STATES PATENTS

| | | | |
|---|---|---|---|
| 2,202,960 | Parker | June 4, | 1940 |
| 2,419,993 | Green et al. | May 6, | 1947 |
| 2,580,433 | Kain | Jan. 1, | 1952 |
| 2,620,825 | Cannon | Dec. 9, | 1952 |
| 2,635,581 | Karig | Apr. 21, | 1953 |
| 2,646,075 | Elkington | July 21, | 1953 |
| 2,736,339 | Asbury et al. | Feb. 28, | 1956 |
| 2,744,540 | Erle | May 8, | 1956 |
| 2,760,511 | Greeff | Aug. 28, | 1956 |